No. 745,438. PATENTED DEC. 1, 1903.
J. T. HOGAN.
SEWING MACHINE.
APPLICATION FILED MAR. 29, 1902.
NO MODEL. 4 SHEETS—SHEET 4.
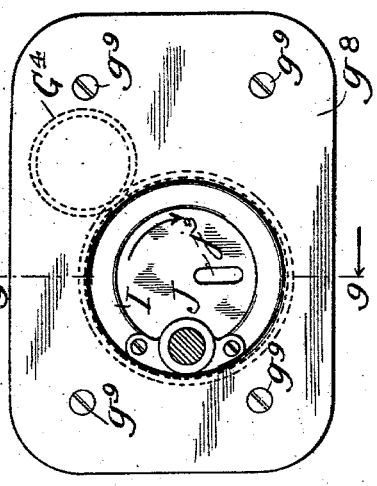
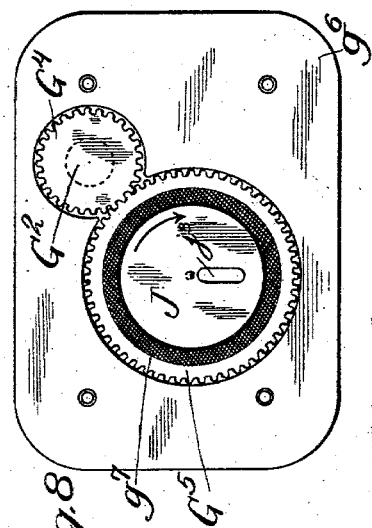
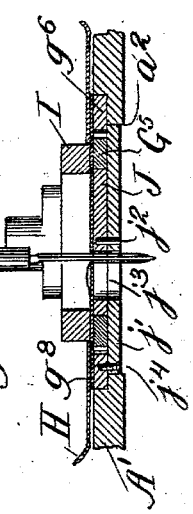
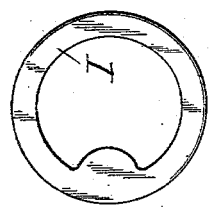
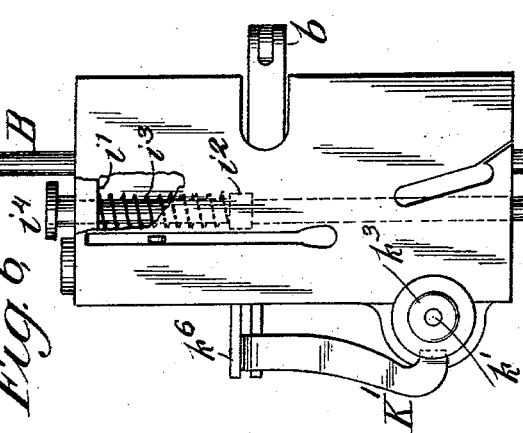
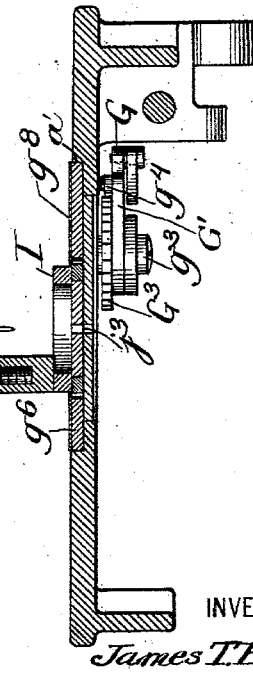
WITNESSES:
INVENTOR
James T. Hogan.
BY
Dickerson, Brown & Caegener
HIS ATTORNEYS No. 745,438.

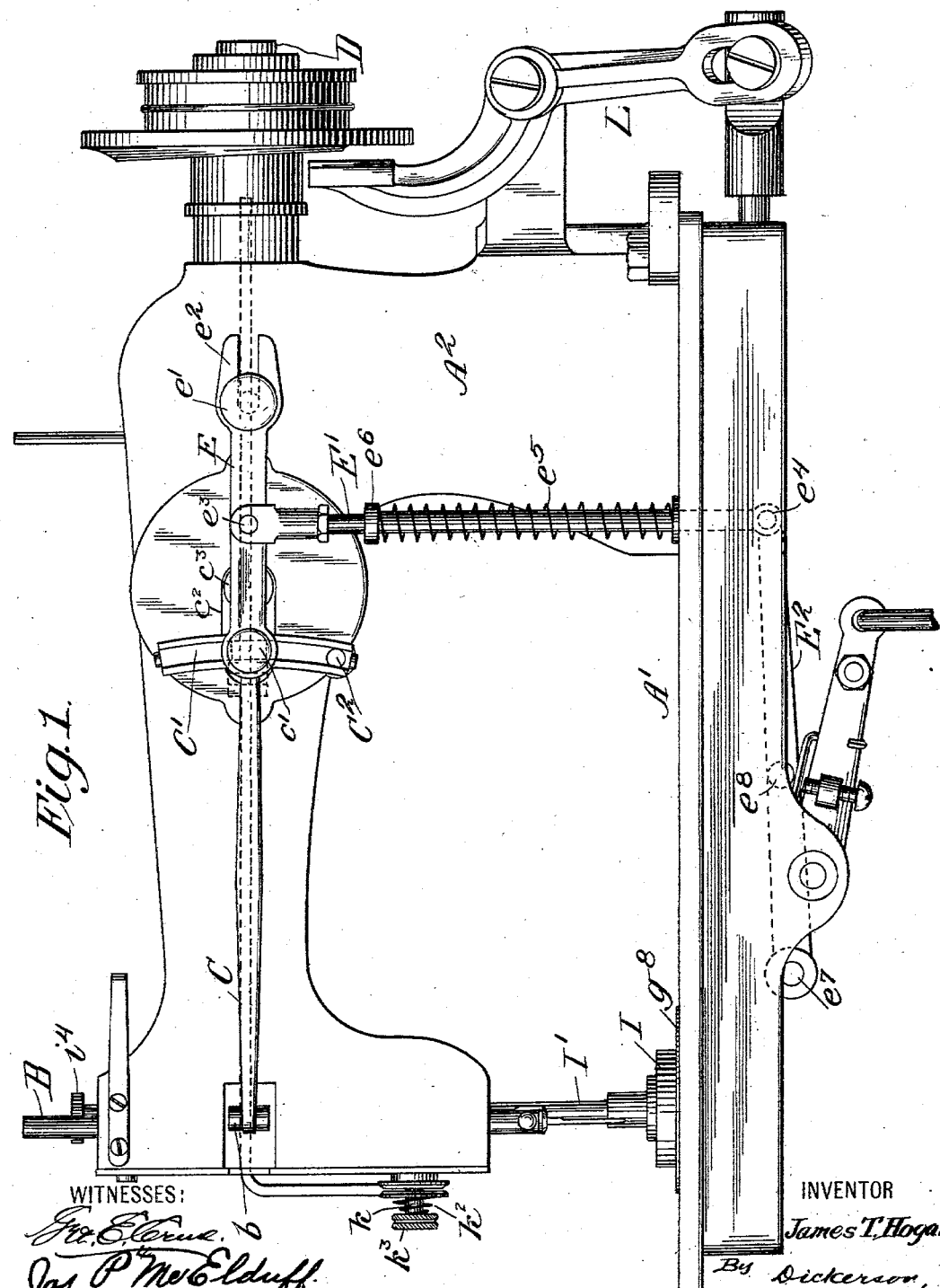

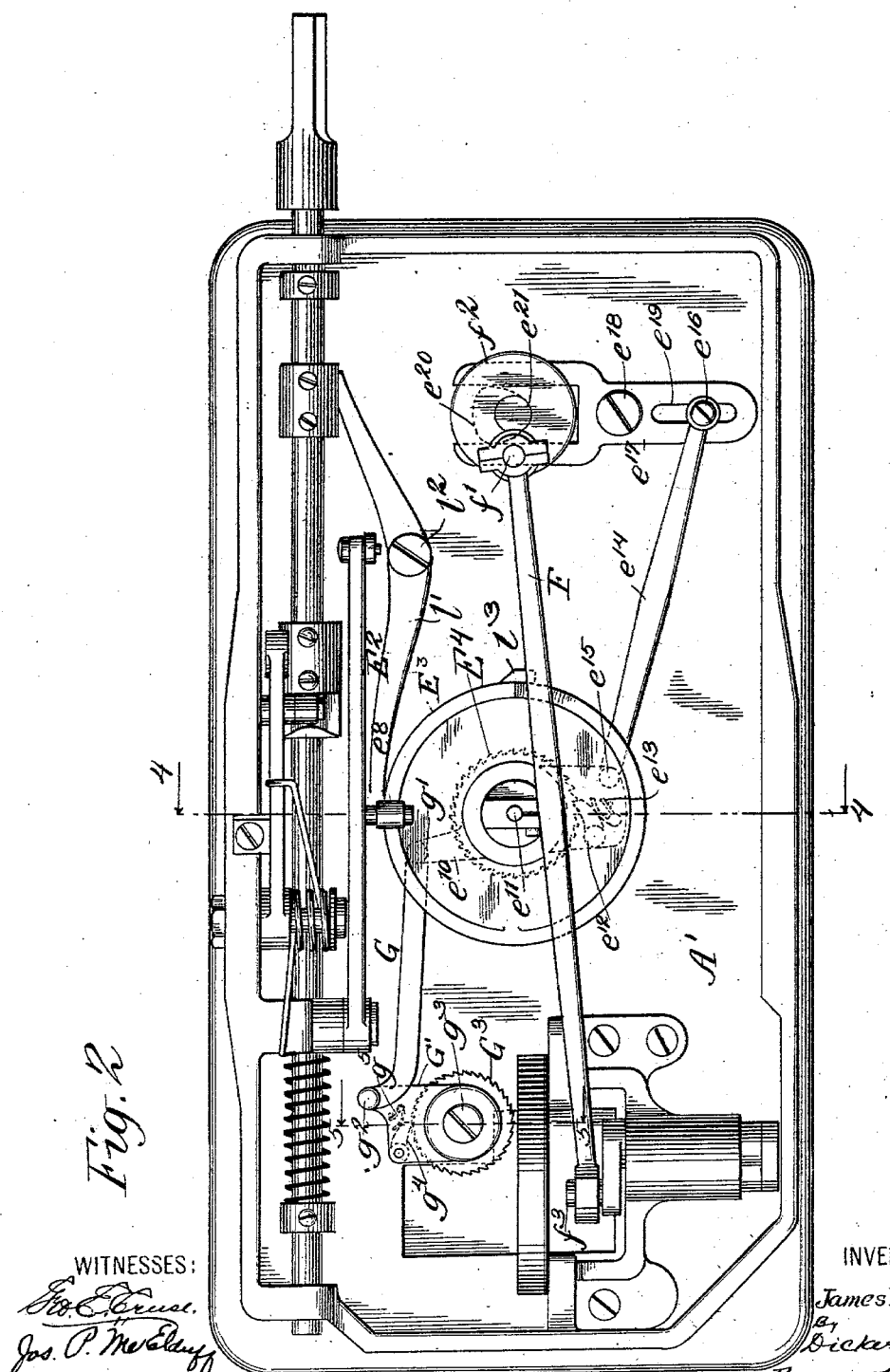

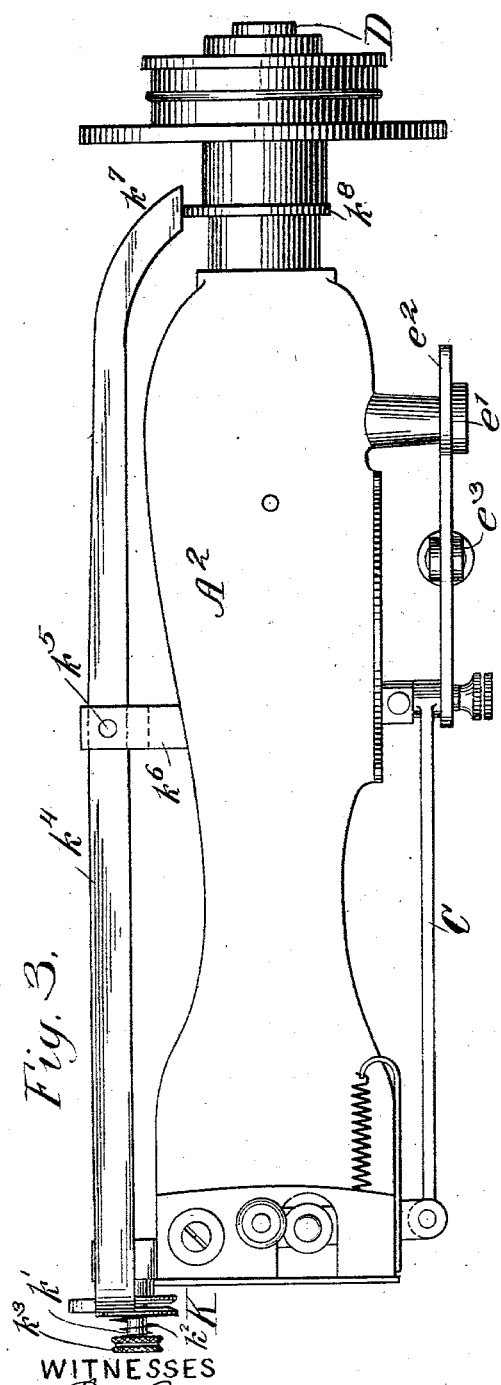
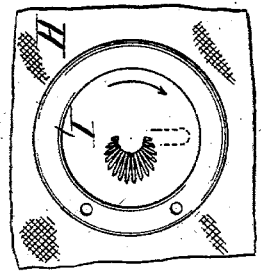
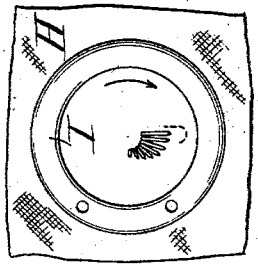
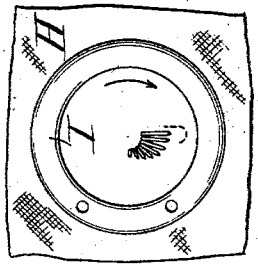
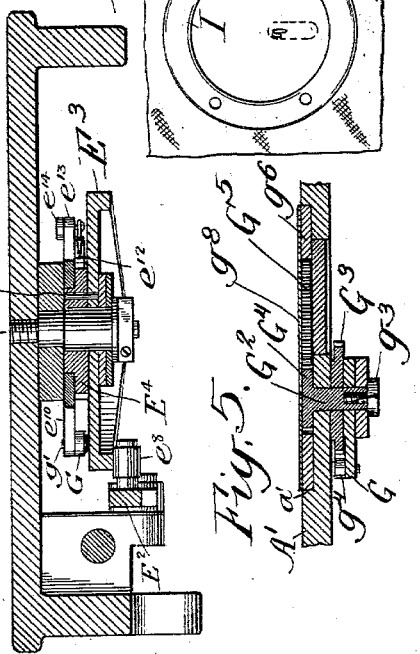

Patented December 1, 1903.

UNITED STATES PATENT OFFICE.

JAMES T. HOGAN, OF JERSEY CITY, NEW JERSEY, ASSIGNOR TO THE NATIONAL MACHINE COMPANY, OF TROY, NEW YORK, A CORPORATION OF NEW YORK.

SEWING-MACHINE.

SPECIFICATION forming part of Letters Patent No. 745,438, dated December 1, 1903.

Application filed March 29, 1902. Serial No. 100,537. (No model.)

*To all whom it may concern:*

Be it known that I, JAMES T. HOGAN, of Jersey City, Hudson county, New Jersey, have invented a new and useful Improvement in Sewing-Machines, of which the following is a specification.

My invention relates to sewing-machines, and has for its object to produce a machine for tacking pocket-openings and work of a similar character.

I will describe a machine embodying my improvement and then point out the novel features in claims.

In the accompanying drawings, Figure 1 is an elevation of a machine embodying my improvement. Fig. 2 is an inverted plan of the same. Fig. 3 is a top view of certain parts. Fig. 4 is a transverse vertical section on the plane of the dotted line 4 4, Fig. 2, looking in the direction indicated by the arrows at the ends of said dotted line. Fig. 5 is a transverse vertical section on the plane of the dotted line 5 5, Fig. 2, looking in the direction indicated by the arrows at the ends of said dotted line. Fig. 6 is partly an end view and partly a transverse vertical section. Fig. 7 is a top view of a plate which is a fixed appurtenance of the bed of the sewing-machine and of other parts which are adjacent to said plate. Fig. 8 is a view similar to Fig. 7 except that the plate mentioned in connection with Fig. 7 is removed in Fig. 8. Fig. 9 is a vertical section taken lengthwise of the machine and at the plane of the dotted line 9 9, Fig. 7, and looking in the direction indicated by the arrows at the ends of said dotted line. Fig. 10 is an inverted plan of the work-clamp. Fig. 11 is a top view of the work-clamp with a piece of work in place, illustrating the starting of certain work which can be performed by the machine. Fig. 12 is a similar view illustrating the progress of the work. Fig. 13 is a similar view illustrating the completion of the work.

Similar letters of reference designate corresponding parts in all the figures.

The sewing-machine head is shown as consisting of a bed A' and an arm $A^2$ of ordinary construction.

B designates a needle-bar having the usual vertical reciprocation. The means for producing its reciprocation may be of any suitable character known in the art, and hence I shall not further describe them or take any pains to illustrate them. The needle-bar also has a to-and-fro movement in a horizontal plane. As means for supporting the needle-bar so as to afford provision for such movement are well known in the art, they do not require particular illustration nor any further description. In the present example of my improvement the to-and-fro movement of the needle-bar is transmitted through an arm $b$, extending from the needle-bar and having pivoted to it one end of a rod C, whose other end is adjustably connected to a rock-lever C', affixed at its lower end to a rock-shaft $C^2$, which is supported in the sewing-machine arm $A^2$. The arm C' is shown as arc-shaped and as longitudinally grooved. A block fits in said groove and has a screw $c'$ connected to it. With this screw one end of the rod C is pivotally connected.

Any suitable means may be employed for rocking the arm C'—as, for instance, a cam engaging with an antifriction-roller extending from the back of the arm C' through a slot $c^2$ into engagement with a cam mounted upon a rotary shaft $c^3$, which may be driven by bevel gear-wheels from the main shaft D of the machine, which extends horizontally through the arm $A^2$. With the screw $c'$ is also pivotally connected one end of a lever E, fulcrumed at the other end upon a stud $e'$, which may be screwed into the sewing-machine arm $A^2$. The end of the lever E which engages with the stud $e'$ is provided with a longitudinal slot $e^2$ where the stud $e'$ passes through it, so that the lever may slide longitudinally as the arm C' rocks to produce the horizontal to-and-fro movement of the needle-bar. Intermediate of the ends of the lever E one end of a rod E' is pivotally connected to it by means of a pin $e^3$. This arm extends downwardly through the sewing-machine bed and at its lower extremity is pivotally connected by a pin $e^4$ to a lever $E^2$. Above the sewing-machine bed the rod E' is surrounded by a helical spring $e^5$, whose upper end bears against a collar $e^6$, which is affixed to said rod. This spring tends to oscillate the lever E upwardly, and consequently to shift the connection of the rod C along the rock-arm C' farther away from the rock-shaft $C^2$.

The lever $E^2$ is fulcrumed upon a stud $e^7$, supported in the sewing-machine bed, and provided intermediate of its ends with an anti-friction-roller $e^8$ for coacting with the downwardly-extending rim of a cam $E^3$, which is arranged beneath the sewing-machine bed and fixedly secured to a ratchet-wheel $E^4$ by a pin $e^9$. The ratchet-wheel $E^4$ in the present example of my improvement may have thirty-six teeth, and it is operated by means of a pawl-lever $e^{10}$, fulcrumed to the stud $e^{11}$, upon which the ratchet-wheel $E^4$ and cam $E^3$ are mounted. This pawl-lever is provided with a pawl $e^{12}$, held in engagement with the ratchet-teeth by a spring $e^{13}$. Motion is imparted to the pawl-lever by a rod $e^{14}$, pivotally connected at one end by a pin or screw $e^{15}$ to the pawl-lever and pivotally connected at the other end by a pin or screw $e^{16}$ to a lever $e^{17}$, which is fulcrumed between its ends upon a pin or screw $e^{18}$. A longitudinal slot $e^{19}$ in this lever, through which the pin or screw $e^{16}$ passes, affords provision for varying the distance of the pin or screw $e^{16}$ from the fulcrum of the lever to alter the throw of the pawl-lever $e^{10}$. A fork in the lever $e^{17}$ receives within it a cam $e^{20}$, mounted upon a shaft $e^{21}$, and thus the requisite oscillation of the lever $e^{17}$ is produced. The shaft $e^{21}$ is provided with a crank-pin $f'$. In the present instance this pin extends from a disk $f^2$, which is affixed to said shaft $e^{21}$. A rod F is pivotally connected at one end to the crank-pin $f'$ and at the other end to a crank-pin $f^3$ upon a shuttle-operating shaft. The pawl-lever $e^{10}$ is pivotally connected, by means of a pin $g'$, with one end of a rod G, which at the other end is pivotally connected, by a pin $g^2$, with a pawl-lever G', which is mounted loosely upon a shaft $G^2$. This shaft $G^2$ is journaled in a bearing formed on the sewing-machine bed. To the lower end of the shaft $G^2$ a screw $g^3$ is fitted. The lever G' is provided with a pawl $g^4$, which coacts with a ratchet-wheel $G^3$, that is affixed to the shaft $G^2$. The head of the screw $g^3$ supports the pawl-lever G' and the ratchet-wheel $G^3$, a washer being shown as interposed between it and the pawl-lever G'. A spring $g^5$ holds the pawl $g^4$ in engagement with the ratchet-wheel $G^3$. The ratchet-wheel $G^3$ is to have the same number of teeth as the ratchet-wheel $E^4$ and will be intermittently rotated in synchronism with the latter.

The upper end of the shaft $G^2$ is provided with a gear-wheel $G^4$, which is shown as being made integral with said shaft. This gear-wheel is represented as located in a recess $a'$, formed in the upper side of the sewing-machine bed. It engages with a gear-wheel $G^5$, which is held in place by fitting within a circular recess in a plate $g^6$, which fits in the recess $a'$ of the sewing-machine bed. On the upper side of the gear-wheel $G^5$ is a roughened surface $g^7$ to engage with the fabric H in which the sewing is to be done. Thus the gear-wheel $G^5$ forms the feed-wheel. The fabric is held upon this roughened surface $g^7$ by means of a work-clamp I, which is approximately ring-shaped, as may be seen in Fig. 10. The under side of this work-clamp is smooth, so that it will not interfere with the rotation of the fabric H by means of the feed-wheel $G^5$.

A throat-plate J of circular form extends through the feed-wheel $G^5$ and is fastened to a lower-plate $j'$ by means of a pin $j^2$. There is a radial slot $j^3$ through the throat-plate J and the plate $j'$. The plate $j'$ forms the lower support for the feed-wheel $G^5$ and fits within a hole $a^2$ in the sewing-machine bed. It is supported by being secured to the plate $g^6$ by means of screws $j^4$ or in any other suitable manner.

The gears $G^4$ $G^5$ are covered by a plate $g^8$, which may be secured by screws $g^9$ to the plate $g^6$.

The work-clamp I is fastened to a rod I', which is fitted to slide vertically in the sewing-machine arm adjacent to the needle-bar B. Below a ledge or projection $i'$ in the sewing-machine arm and a collar $i^2$ affixed to the rod I' a helical spring $i^3$ is coiled around the rod I', so as to press the work-clamp downwardly. A handle $i^4$, affixed to the upper end of the rod I', affords facility for raising the work-clamp against the resistance of the spring.

K designates a needle-thread tension comprising two disks loosely mounted upon a stud $k'$ and pressed together by means of a helical spring $k^2$, coiled around the stud between one of the disks and a nut $k^3$, engaged with a screw-thread on the end portion of the stud. With these disks is combined a separator K', extending between the disks and preferably having a tapered extremity, so that it may operate with a wedging action to separate the disks. This separator is arranged at the end of a lever $k^4$, fulcrumed between its ends by a pin $k^5$ to a bracket $k^6$, extending horizontally from the sewing-machine arm and having its other end, $k^7$, bearing against a cam $k^8$, carried by the main shaft D of the machine.

In the present example of my invention the feed-wheel $G^5$ makes one complete rotation for the sewing of a set of stitches, such as are represented in Fig. 13, and it is moved rotarily a distance necessary for each successive stitch during each rotation of the main shaft D. The tension is relaxed each time the needle descends, and hence during each rotation of the main shaft D. This relaxation of the tension is to enable long loose stitches to be formed, as represented in Figs. 11, 12, and 13.

It is to be understood that the needle will descend through the radial slot $j^3$ of the throat-plate J and plate $j'$ alternately near different end portions of said slot. It will be observed that the center of the feed-wheel is eccentric to the nearer end of the slot $j^3$, and this will cause the inner ends of the stitches represented in Figs. 11, 12, and 13 to be arranged in a circle which is concentric to the feed-wheel $G^5$. The length of the stitches is varied by the operation of the cam $E^3$ upon the lever $E^2$, the rim of the cam being so shaped that the outer ends of the stitches will be arranged in a curve which is not concentric with the curve formed by the inner ends of the stitches.

L designates a stop mechanism of well-known form. It is normally held inoperative by means of a lever $l'$, fulcrumed between its ends upon a pin or stud $l^2$, and released by means of a cam-surface $l^3$, arranged upon the circumference of the cam $E^3$. As already explained, the cam $E^3$ makes one rotation during the sewing of a complete set of stitches, such as are represented in Fig. 13. Consequently the cam-surface $l^3$ must be disposed so as to release the stop mechanism immediately upon the completion of such set of stitches.

Obviously by changing the proportions of the feed-wheel $G^5$ and gear-wheel $G^4$ relatively to each other and by varying the surface of the cam $E^3$ sets of stitches varying considerably from those represented in Fig. 13 may be sewed. In short, this improvement affords opportunity for sewing a number of stitches radially about a center and varying the design of an entire set of stitches, so as to make them extend around the whole or any desired part of a circle, besides varying them in length relatively to each other throughout different portions of an entire set.

What I claim as new, and desire to secure by Letters Patent, is—

1. In a machine for sewing tacking-stitches the combination with the work-support and needle and concomitant parts of means for giving a vibratory movement to the needle, a lever and means for actuating the same, means actuated by said lever for rotating the work-support and independent means also actuated by said lever for automatically varying the amplitude of vibration of the needle for each successive stitch, whereby radially-disposed stitches of successive different lengths may be sewed, substantially as described.

2. In a machine for sewing tacking-stitches the combination with the work-support and needle and concomitant parts, of means for giving a vibratory movement to the needle, a driving-shaft, a pawl-lever actuated thereby, means connected to and actuated by said lever for rotating the work-support and independent means also actuated by said lever to automatically vary the amplitude of vibration of the needle for each successive stitch.

3. In a machine for sewing tacking-stitches the combination with the work-support and needle and concomitant parts, of means for giving a vibratory movement to the needle, a pawl-lever and means for actuating the same, a ratchet-wheel actuated by said pawl-lever, a cam connected to said wheel and means actuated by said cam to automatically vary the amplitude of vibration of the needle for each successive stitch, a second ratchet-wheel also actuated by said lever and means connected to said second ratchet-wheel to intermittently rotate the work-support.

4. In a machine for sewing tacking-stitches the combination with the work-support and needle and concomitant parts, of means for giving a vibratory movement to the needle, a pawl-lever and means for actuating the same, a ratchet-wheel actuated by said pawl-lever, a cam connected to said wheel and means actuated by said cam to automatically vary the amplitude of vibration of the needle for each successive stitch, a second ratchet-wheel also actuated by said lever and means connected to said second ratchet-wheel to intermittently rotate the work-support, said ratchet-wheels having the same number of teeth.

5. In a machine for sewing tacking-stitches the combination with the work-support and needle and concomitant parts, of means for giving a vibratory movement to the needle, comprising a rock-lever and a pitman connected at one end to the needle-bar frame and at the other end having a sliding connection with said rock-lever, a pawl-lever, a ratchet-wheel actuated by said pawl-lever, a cam connected to and intermittently rotated by said ratchet-wheel and mechanism connected to said pitman and actuated by said cam to move the free end of said pitman lengthwise of the rock-lever to thereby automatically vary the amplitude of vibration of the needle-bar for each successive stitch, and means also actuated by said pawl-lever to rotate the work-support.

In testimony whereof I have signed my name to this specification in the presence of two subscribing witnesses.

JAMES T. HOGAN.

Witnesses:
K. G. LE ARD,
GEO. E. CRUSE.